United States Patent [19]

Napiorkowski

[11] 4,275,432

[45] Jun. 23, 1981

[54] THERMAL SWITCH SHORT CIRCUITING DEVICE FOR ARRESTER SYSTEMS

[75] Inventor: John Napiorkowski, Massapequa Park, N.Y.

[73] Assignee: TII Corporation, Lindenhurst, N.Y.

[21] Appl. No.: 878,461

[22] Filed: Feb. 16, 1978

[51] Int. Cl.[3] .......................... H02H 3/22; H02H 9/04

[52] U.S. Cl. .................................... 361/124; 361/119; 337/32; 337/34; 337/409

[58] Field of Search ............... 361/117, 124, 119, 120, 361/118; 337/32, 33, 34, 28, 18, 407, 408, 409

[56] References Cited

U.S. PATENT DOCUMENTS

| | | | |
|---|---|---|---|
| 2,724,793 | 11/1955 | Fisher | 361/124 |
| 3,254,179 | 5/1966 | Howard | 361/124 X |
| 3,254,181 | 5/1966 | Lemieux | 361/124 X |
| 3,281,625 | 10/1966 | Wanaselja . | |
| 3,340,431 | 9/1967 | Wanaselja . | |
| 3,522,570 | 8/1970 | Wanaselja | 337/32 X |
| 3,755,715 | 8/1973 | Klayum et al. | 361/124 X |
| 3,896,343 | 7/1975 | Baker et al. . | |
| 4,037,266 | 7/1977 | English et al. | 361/117 X |
| 4,056,840 | 11/1977 | Lundsgaard et al. | 361/124 |
| 4,062,054 | 12/1977 | Simokat | 361/124 X |
| 4,085,397 | 4/1978 | Yagher, Jr. | 337/409 X |
| 4,129,894 | 12/1978 | Chen | 361/124 X |
| 4,133,019 | 1/1979 | Roach et al. | 361/124 |
| 4,150,414 | 4/1979 | Pagliuca | 361/124 |

*Primary Examiner*—Patrick R. Salce
*Attorney, Agent, or Firm*—Morgan, Finnegan, Pine, Foley & Lee

[57] ABSTRACT

Gas filled surge arrester is equipped with a thermally responsive short circuit switch for overload protection and air gap shorting for back up overload protection. The switch and air gap device is disclosed in three orientations; namely, separate and external to the gas tube; unitized with the air gap interior to the switch; and unitized with the air gap exterior to the switch. The unitized arrangements have application in circuitry with gas tubes where back up air gap protection of the thermal switch is desired.

63 Claims, 21 Drawing Figures

THERMAL SWITCH SHORT CIRCUITING DEVICE FOR ARRESTER SYSTEMS

CROSS-REFERENCE TO RELATED APPLICATION

This application is related to commonly assigned U.S. Application Ser. No. 719,077, filed Aug. 31, 1976; Ser. No. 741,247, filed Nov. 12, 1976; and Ser. No. 843,320, filed Oct. 18, 1977, the disclosures of which are incorporated herein.

BACKGROUND

Gas tube overvoltage protectors are widely used for the protection of equipment from overvoltage conditions which may be caused by lightning, high voltage line contact, and the like.

It is also a widely practiced technique to associate various fail-safe arrangements with such tubes and with other types of protectors, e.g. air gap arresters, to meet various contingencies. For example, the presence of a sustained overload, as where a power line has come in continued contact with a protected telephone line, produces a concomitant sustained ionization of the gas tube and the resultant passage of heavy currents through the tube. Such currents will in many cases destroy the overvoltage protector and may also constitute a fire hazard.

One common approach to this problem is to employ fusible elements which fuse in the presence of such overloads and provide either a permanent short circuiting of the arrester directly, or function to release another mechanism, e.g., a spring loaded shorting bar, which provides the short circuit connection (commonly, the arrester electrodes are both shorted and grounded). The presence of the permanent short and ground condition serves to flag attention to that condition thus signalling the need for its inspection or replacement. Examples of this type of fail-safe protection are found in U.S. Pat. Nos. 3,254,179; 3,281,625; 3,340,431; 3,396,343; and 3,522,570. Several of these patents also incorporate with the fail-safe feature, a backup air gap arrangement so that there is both fail-safe fusible (short) type protection as well as backup air gap protection.

Still another approach, disclosed in commonly assigned application Ser. No. 719,077, is based on the discoveries that an effective fail-safe function can be achieved by employing a non-metallic fusible material and that important advantages are consequently realized. The fusible material is an electrical insulator which in the exemplary embodiments is interposed between one or more of the electrodes and the shorting mechanism. Surprisingly, the response of the non-metallic material to thermal conditions is precise and, moreover, does not leave an insulative film in the course of fusing which might otherwise interfere with the short circuit contact.

The need exists, nonetheless, to develop fail-safe arrangements which provide both surge and failure protection for gas tube arresters.

SUMMARY

The present invention is directed to fail-safe surge arrester assembly in which both back-up surge and air gap back-up protection is provided with economically producible systems.

Accordingly, the present invention may be summarized as follows:

A gas tube assembly having a thermal switch operative toward a short circuit connection with the tube electrodes, with air gap means interposed between one electrode and the ground. The thermal switch and air gap means may be integral with the air gap within or without the switch or they may be separate. The integral thermal switch and air gap embodiments have use in surge arresters. In addition there are other industrial control applications in which back-up protection with a thermal switch in accordance with the present invention is desired.

DETAILED DESCRIPTION

Figure 1:
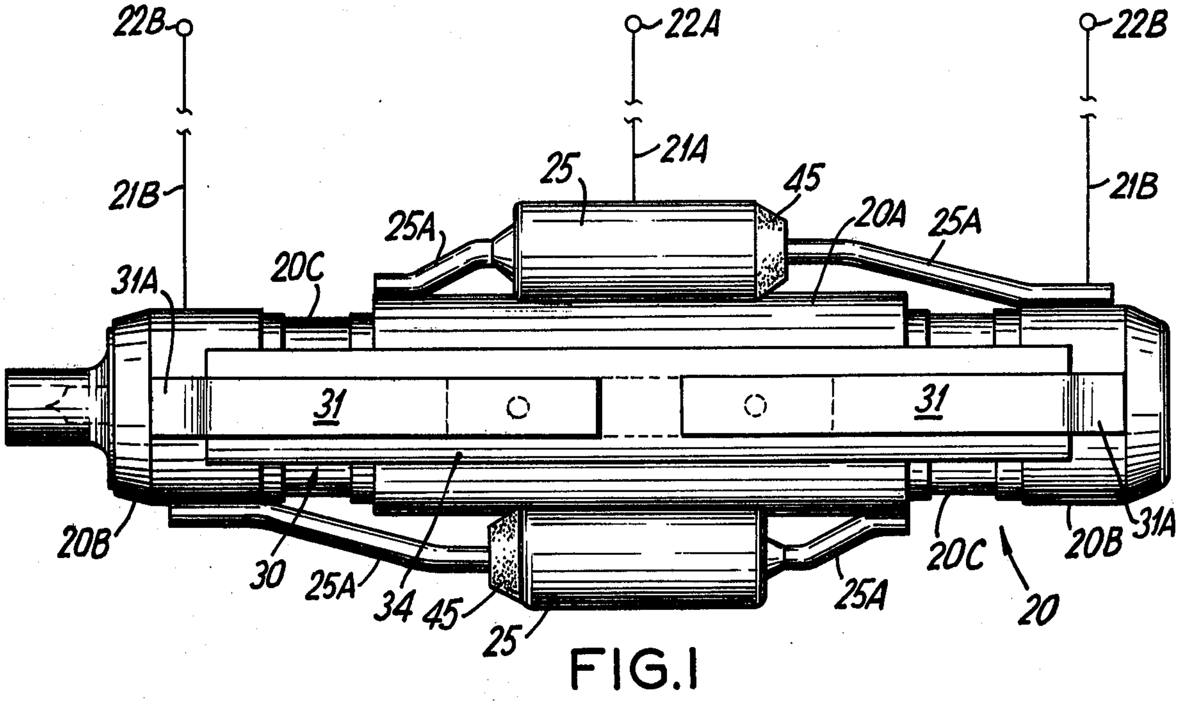
FIG. 1 is an elevation view, partly schematic, of a gas filled surge arrester with thermal switches and air gap in accordance with the present invention.

While this invention is susceptible of embodiment in many different forms, there is shown in the drawings and will hereinafter be described in detail preferred embodiments of the invention, and modifications thereto, with the understanding that the present disclosure is to be considered as an exemplification of the principles of the invention and is not intended to limit the invention to the embodiments illustrated.

Figure 2:
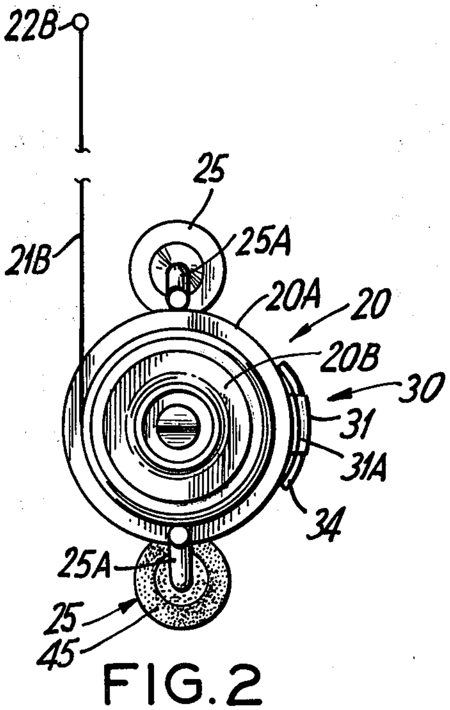
FIG. 2 is a left end elevation view of the arrester of FIG. 1.

In the embodiment illustrated in FIGS. 1 and 2, a gas tube 20 is provided, the tube including a center body 20A and electrode end caps 20B each separated from the center body 20A by a respective insulated sleeve section 20C.

The arrester 20, which is of known construction and may comprise for example TII Model 31, has its end electrodes (not shown) extending inwardly from the end caps 20B toward the center of the tube interior to define a gap between the electrodes. Spacing and dimensions are such that each electrode also forms a gap with the center body conductive casing section 20A.

The tube is filled with a gas and the electrode end caps 20B are each provided as by welding with a lead 21B and terminal 22B, e.g., a spade lug, for connection to the circuit to be protected. Center body 20A is likewise provided with a lead 21A welded thereto and the associated connection 22A for connection to ground.

In the presence of overvoltage conditions the gas in tube 20 ionizes thereby creating in known manner, conductive shunting paths between each line of the protected circuit and ground (via the respective terminal lead 21B and ground lead 21A).

A short circuiting thermal switch 25 is disposed between each line electrode 20B and the ground electrode 20A as by welding the switch leads 25A thereto. Thermal switches 25 may be of any conventional type which have the thermal conditions and capacity for use with the gas tube arrester. Suitable normally open thermal switches without dimensioned air gaps are commercially available from the Micro Devices Division of Emerson Electric Company, Dayton, Ohio.

Each switch 25 is preferably positioned on the gas tube such that the switch is in thermal contact with the center body 20A. In this manner heat generated by prolonged ionization in the tube is transferred to the switch to cause activation and short circuiting.

A back-up air gap device 30 is also disposed between each line electrode 20B and the ground electrode 20A. Such air gap devices are described in the above-mentioned U.S. Patent Application Ser. No. 843,320.

Figure 3:
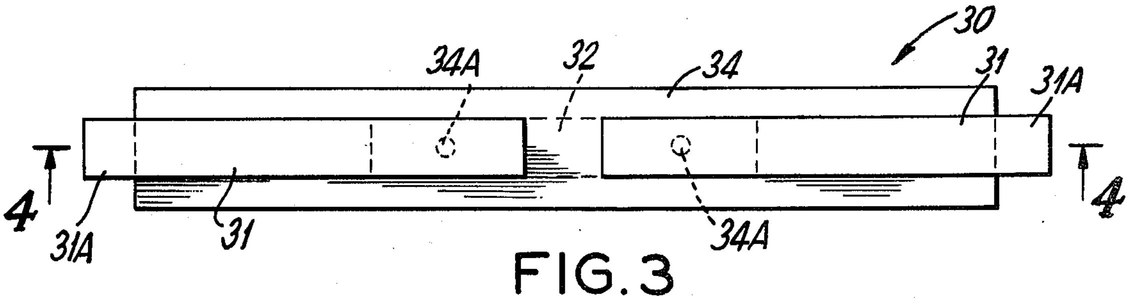
FIG. 3 is a plan view of the air gap device shown in FIG. 1 on an enlarged scale.
Figure 4:
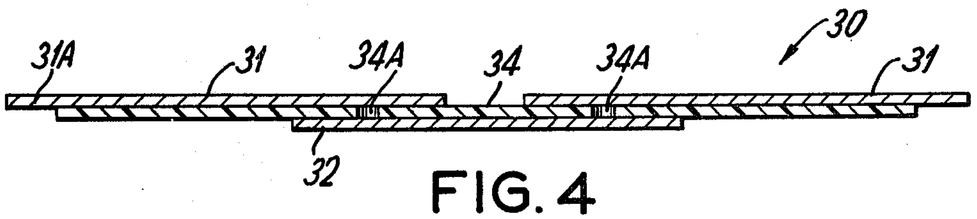
FIG. 4 is a cross-sectional view taken along line 4—4 in FIG. 3.

With particular reference to FIGS. 3 and 4, air gap device 30 includes a pair of first conductive layers 31 in the form of a rectangular layer of metallic conductor material, e.g. copper. Each layer 31 is bonded at its free end 31A in electrical contact with an end cap 20B. A second layer 32 of conductive material is in overlapping relationship with layer 31. Layer 32 is in direct contact with center body 20A. Interposed between layers 31 and 32 is a non-metallic layer 34 of insulating material of the type described below which includes an aperture 34A therein to define an air gap between the overlapping portion of layers 31 and 32. Since gas tube 20 has two line electrodes, a pair of conductive layers 31 and associated air gaps 34A are provided. However, it will be understood that the device works equally well when the gas tube has one line electrode and one ground electrode. The air gap distance is a function of the thickness of layer 34 to provide a strike voltage commensurate with the arrester. A typical air gap thickness is 3 mils for a strike voltage in the range of 550–850 volts D.C.

Layer 34 may be of non-metallic, electrically insulative composition or polyimide sold under the designation Kapton. Suitable materials may have melt temperatures in the range corresponding to thermal conditions at arrester thermal overload and will have suitable dielectric strength, dielectric constant, dissipation factor and volume and surface resistivity to provide the requisite insulative function. The preferred material should also be free of embrittlement due to heat aging, be nonflammable under the overload conditions, have good mechanical properties and be inert to corrosives and weather.

Exemplary of the class of materials for layer 34 are certain of the fluoroplastics, such a fluorinated ethylene propylene polymer (FEP), the polymer perfluoroalkoxy (PFA), the modified copolymer of ethylene and tetrafluoroethylene (ETFE) (marketed under the DuPont Company trademark Tefzel), and poly (ethylene-chlorotrifluoro-ethylene) (E-CTFE copolymer) marketed under the Allied Chemical Corporation mark Halfar.

During normal operation of the arrester 20, transient surges produce ionization in the normal manner to protect the subject equipment. If, however, a sustained surge condition occurs as where a line is permanently contacted by a higher voltage line, the resultant ionization currents flowing through the arrester produce excessive heat; each switch 25, placed in the arrester region to respond to this heating, thereby shorts. When electrical contact is made in each switch, a short circuit is established between the respective end cap and the center body thus providing a fail-safe (short) action.

Additionally, the air gaps 34A between layers 31 and layer 32 provide back-up protection in the event of gas tube failure. With this additional provision a failure of the gas tube in the open mode, as for example by reason of a gas leak, does not result in a loss of protection; the air gap provides back-up protection prior to arrester replacement.

Unitized Thermal Switch And Air Gap

An alternative to the separate arrangement of thermal switches and air gap devices is a unitized thermal switch and air gap arrangement. The benefits of a unitized construction are reduction in assembly time, lower cost and quality control. Moreover, the unitized construction allows the assembly to be used for a variety of applications.

The unitized assembly may take various forms which can be classified as two basic types. The first is where the air gap is interior to the thermal switch and the second is a thermal switch with an external air gap device. Examples of each type will be described below.

a. Thermal Switches With Internal Air Gap Back Up

FIGS. 5–8 and 13–14 illustrate various embodiments for thermal switches in which the air gap is within the switch itself. Common components in each switch are designated by common numerical designations.

Figure 5:
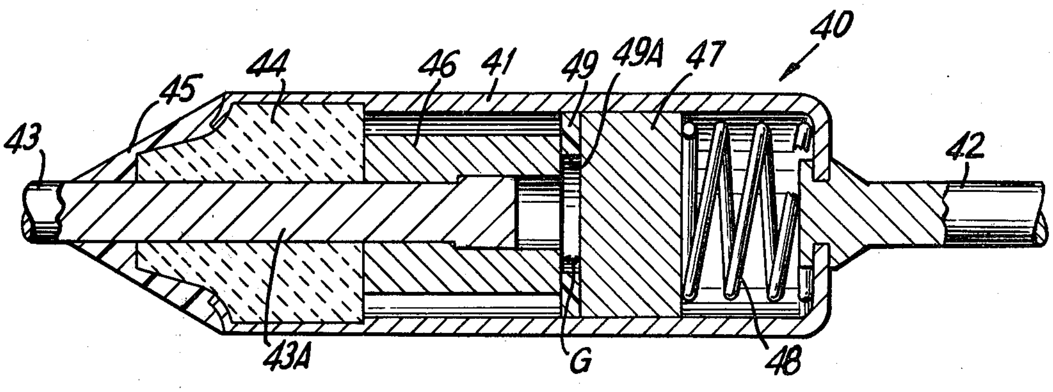
FIG. 5 is a longitudinal cross-sectional view of a first thermal switch embodiment with internal air gap.

With reference to FIG. 5, the thermal switch 40 includes a metallic conductive casing or housing 41 of generally tubular shape. One end of housing 41 is in electrical contact with lead 42. The other lead 43 is positioned coaxially within housing 41 and insulated therefrom by a ceramic bushing 44 and sealed by sealing compound 45, e.g. epoxy.

The interior end 43A of lead 43 extends beyond bushing 44 and carries concentrically thereon a metallic fusible member 46 of generally cylindrical shape. Suitable material for fusible member 46 is solder or may be any metal or metal alloy of suitable melting point. Member 46 is spaced inwardly from the interior surface of housing 41 and when subjected to heating, as when tube 20 is under sustained overload, melts to make electrical contact with the housing 41 and also allow a plunger 47, described below, to move into contact therewith.

A plunger 47 is slidably positioned within housing 41 and in electrical contact therewith. Plunger 47 is electrically conductive as for example a brass pellet. Plunger 47 is biased toward lead end 43A by a compression spring 48 so that upon fusion of member 46 plunger 47 moves to the left in FIG. 5 to contact end 43A.

Plunger 47 is maintained in a spaced relation from lead end 43A by the extended portion of fusible member 46 and is insulated therefrom by an insulating washer or ring 49. The ring 49 may be fusible or non-fusible plastic or mica. In addition to insulating the plunger 47 from member 46, the ring 49 serves to define an air gap G. To this end the interior edge 49A of ring 49 has an enlarged diameter to expose the end of member 46 to plunger 47, thereby providing arcing surfaces for the air gap. A typical air gap of 3 mils may be used.

Figure 6:
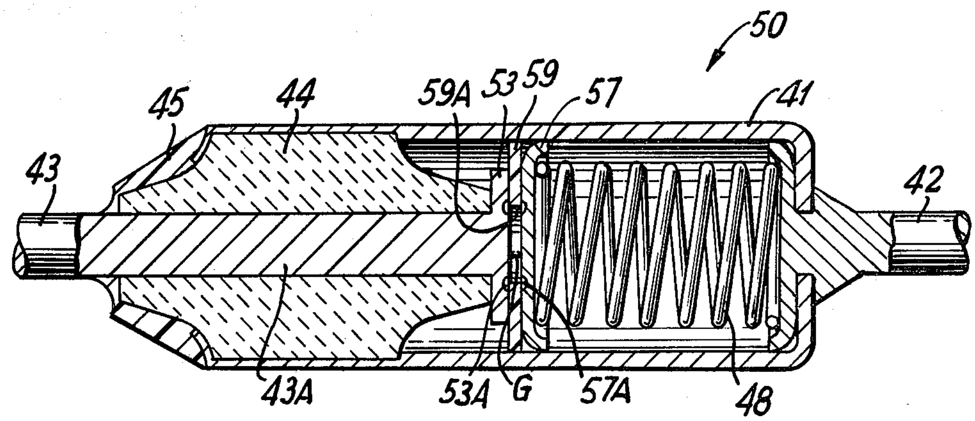
FIG. 6 is a longitudinal cross-sectional view of a second embodiment of a thermal switch with internal air gap with means for controlling the gap between the conductor and plunger.

FIG. 6 illustrates a second thermal switch 50 with internal air gap. Switch 50 includes a lead end 43A having an enlarged disc shaped portion 53. The free surface of portion 53 includes an annular depression or cut-out 53A. Similarly, the plunger 57 is provided with a corresponding cut-out 57A in opposed relationship to cut-out 53A.

Plunger 57 is insulated and spaced from portion 53 by a non-metallic fusible washer 59 of material previously described. The circular hole edge 59A of fusible washer 59 is such as to be positioned substantially centrally of annular cut-outs 53A and 57A. This arrangement militates against arcing at the edge of the washer 59 since cut-outs 53A and 57A form juxtaposed depressions in faces of portion 53 and plunger 57. The air gap G is thus formed in the open area of washer 59.

During operation, heating of switch 50 causes fusible washer 59 to yield and allow plunger 57 to move in to contact member 53, thereby short circuiting.

Figure 6A:
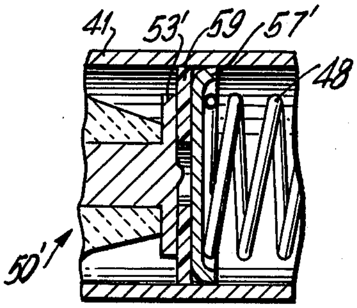
FIGS. 6A, 6B and 6C are fragmentary longitudinal views of thermal switches similar to that shown in FIG. 6 showing other alternative means for controlling the gap.
Figure 6B:
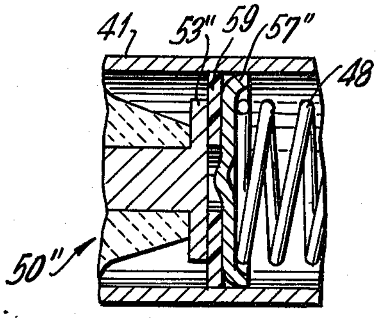
Figure 6C:
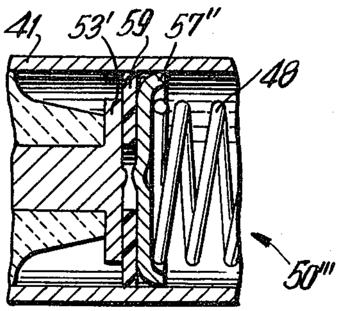

FIGS. 6A, 6B and 6C are switches 50', 50'' and 50''', which are variations on the switch of FIG. 6 and are modified to improve the air gap characteristics by militating against arcing at the edge of the disc shaped portions 53' and 53'' and associated plungers 57' and 57''. This is achieved by providing the gap between a protrusion on the disc portion, or plunger or both, FIGS. 6A, 6B and 6C, respectively. The protrusions assure the arcing will take place thereat and away from the edge of insulating ring 59.

Figure 7:
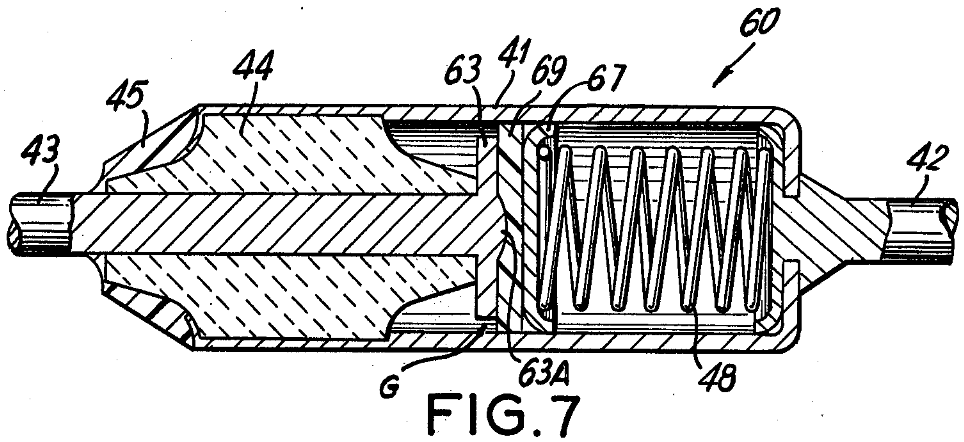
FIG. 7 is a longitudinal cross-sectional view of a third embodiment of a thermal switch with an internal air gap formed between the conductor and interior surface of the switch housing.

FIG. 7 illustrates a third thermal switch 60 having an internal annular air gap. Switch 60 includes a lead end portion 63 of enlarged diameter such that the distance between the peripheral edge of portion 63 is spaced an air gap distance from the internal surface of housing 41. Thus, air gap G is formed between lead 43 and housing 41. The periphery of portion 63 is illustrated as being circular. However, other contours, such as serrated, sinusoidal, or other shapes to create multi-air gaps along the periphery are also within the scope of this invention. Portion 63 is spaced from plunger 67 by a non-metallic, fusible disc 69 of the type of material previously described. The surface of portion 63 abutting disc 69 includes a protrusion 63A illustrated as centrally disposed. The function of the protrusion is to facilitate contact with plunger 67 when the fusible disc 69 yields.

Figure 7A:
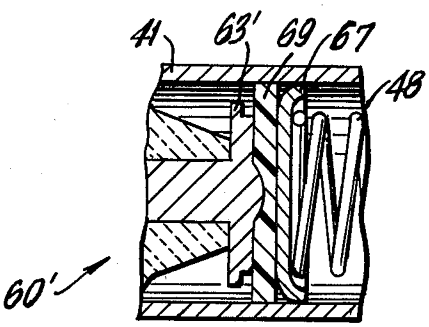
FIGS. 7A and 7B are fragmentary, longitudinal views of thermal switches similar to that shown in FIG. 7 showing other alternative means for controlling the air gap.
Figure 7B:
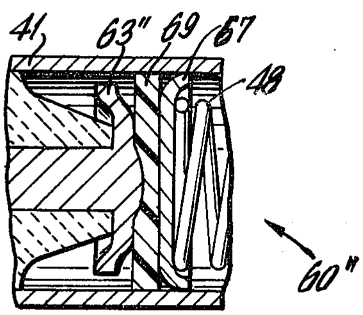

FIGS. 7A and 7B show switches 60' and 60'' which have shouldered, FIG. 7A, or sweep-back peripheral edges on the end portions 63' and 63''. The set-back of the peripheral edge from disc 69 helps to assure that arcing takes place between the edge 63' or 63'' and housing 41 and not along the surface of disc 69. Surface discharge may have the effect of carbonizing the plastic surface.

Figure 8:
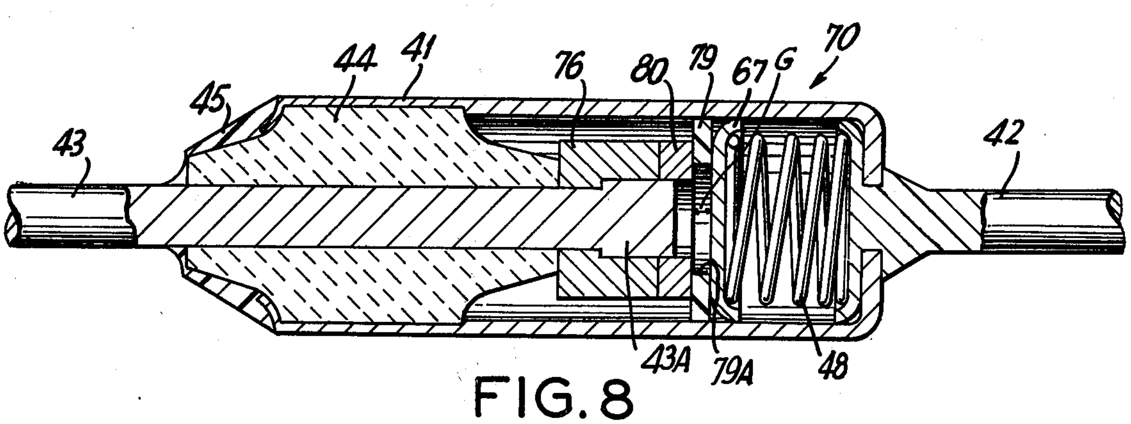
FIG. 8 is a longitudinal, cross-sectional view of still another embodiment of a thermal switch with internal air gap.

The thermal switch 70 illustrated in FIG. 8 is similar in structure and operation to switch 40. A metallic fusible member 76 is carried concentrically on lead end 43A. The lead end 43A extends beyond member 76 and further carries a metallic, non-fusible washer 80, e.g. brass. Washer 80 is slidable on lead end 43A so that when fusible member 76 yields, washer 80 moves to the left under the influence of plunger 67. In this manner the fusible material, e.g. solder, is pushed to the left so that lead end 43A may make uninterrupted contact with plunger 76. Washer 80 is spaced from plunger 67 by an insulative washer 79. The inner diameter 79A of washer 79 is enlarged to define an annular air gap G between washer 80 and plunger 67.

Figure 8A:
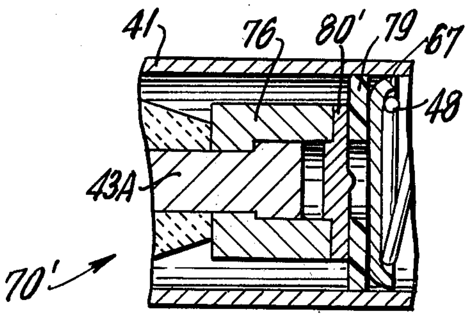
FIGS. 8A and 8B are fragmentary, longitudinal views of thermal switches similar to that shown in FIG. 8 and illustrative alternative approaches to air gap control.
Figure 8B:
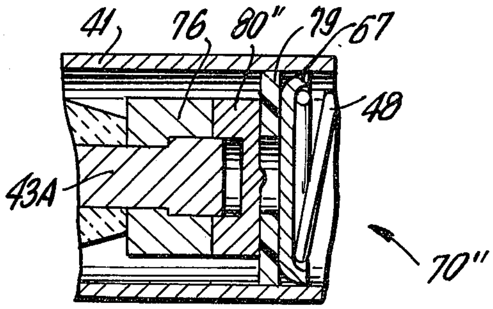

The switches 70' and 70'' in FIGS. 8A and 8B are variations to switch 70 wherein the metallic non-fusible member 80' and 80'' is generally disc shaped and provided with a protrusion on its face juxtaposed to plunger 67 to improve the arcing of the air gap as previously described in reference to FIGS. 6A, 6B and 6C. Disc 80' in FIG. 8A is carried in the bore of member 76 and will contact lead end 43A when fusing occurs. Disc 80'' on the other hand is carried on lead end 43A by an annular shoulder. Washer 79 in the switches 70' and 70'' is, of course, a fusible plastic material of the type described to permit contact to be made between plunger 67 and disc 80' or 80''.

b. Thermal Switch With External Air Gap

Figure 9:
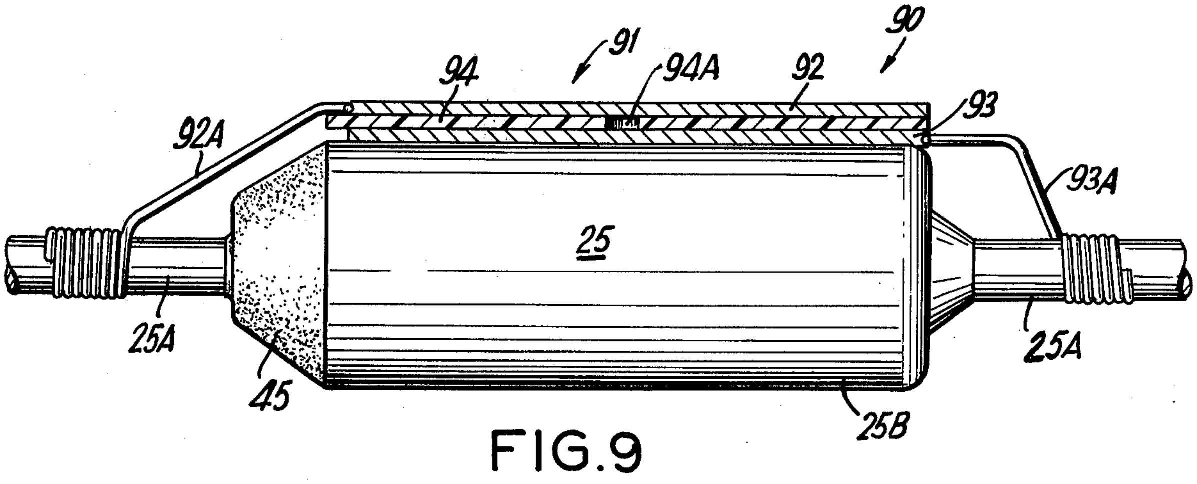
FIG. 9 is a thermal switch with an exterior air gap device.

FIG. 9 illustrates a thermal switch 90 of the present invention which includes a conventional thermal switch 25 with leads 25A. Connected across the leads 25A is an air gap device 91 which acts as a back up protector for the switch.

Thermal switch 25 may be of any conventional type including bi-metallic; spring loaded fusible, etc. The housing 25B may be metallic or non-metallic since the air gap device 91 is electrically connected to the leads.

As illustrated, air gap device 91 includes two metallic layers 92 and 93, e.g. copper, and may be coated with a layer of copper oxide in the area of the air gap, each electrically connected to a lead by lines 92A and 93A, respectively.

The layers 92 and 93 are separated by a layer 94 of insulating material having an aperture 94A therein. The thickness of the layer 94 determines the air gap distance.

It will be appreciated that any of the unitized thermal switches 40, 50, 60, 70 or 90 and the variations thereof may be used with surge arrester 20 in place of switches 25 and air gap device 30. However, the utility of the unitized thermal switch also extends to other circuitry applications where back up air gap protection is desired. Additionally, in these applications the thermal switch may be of the fail short type or fail open type.

Finally, when used with surge arrester, the entire assembly may be potted in epoxy or other means for hermetically sealing the device.

Figure 10:
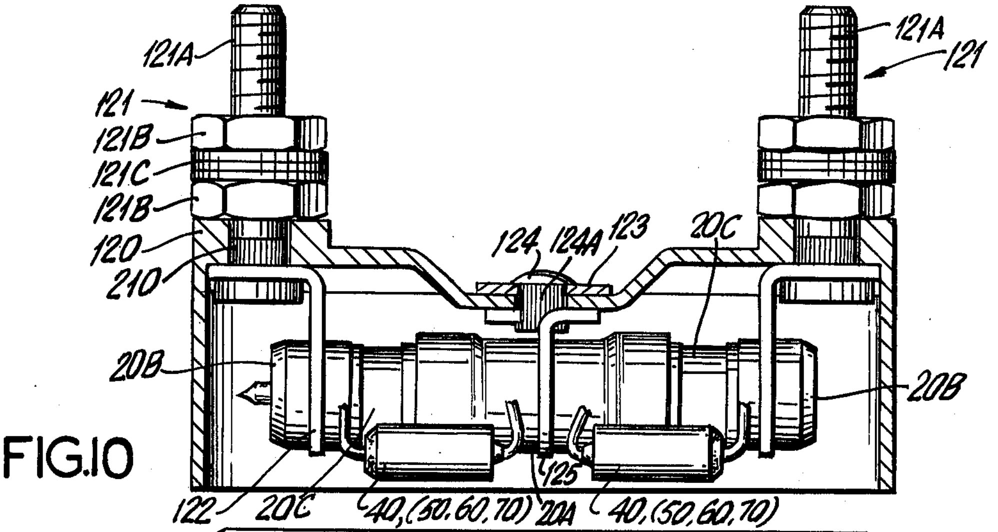
FIG. 10 is an elevation view, partly in section, of the modular component of another embodiment.
Figure 11:
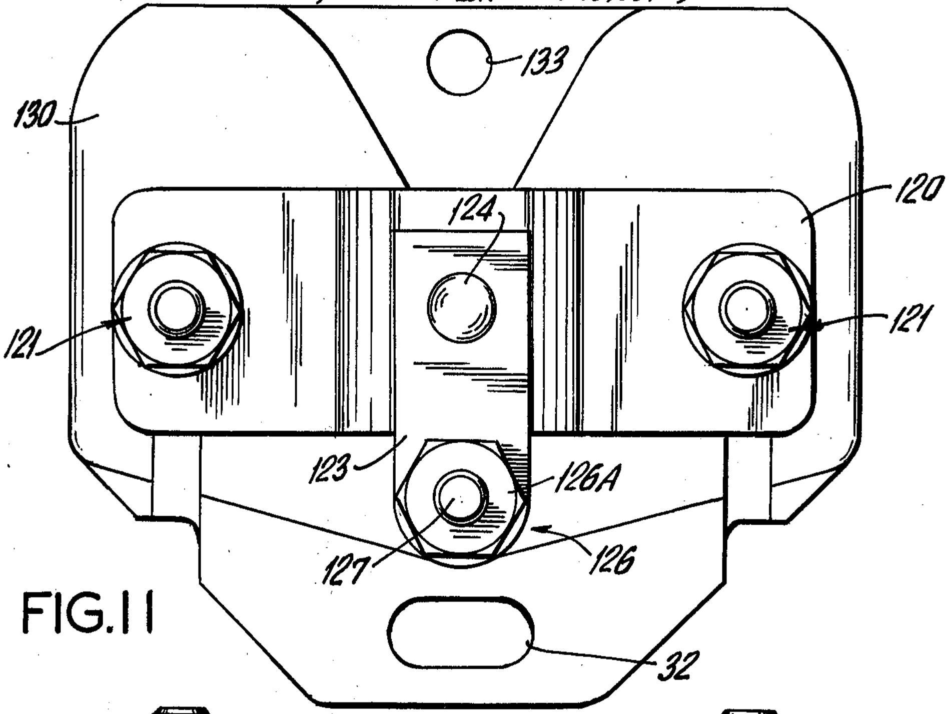
FIG. 11 is a plan view of the embodiment of FIG. 10 mounted in its housing.
Figure 12:
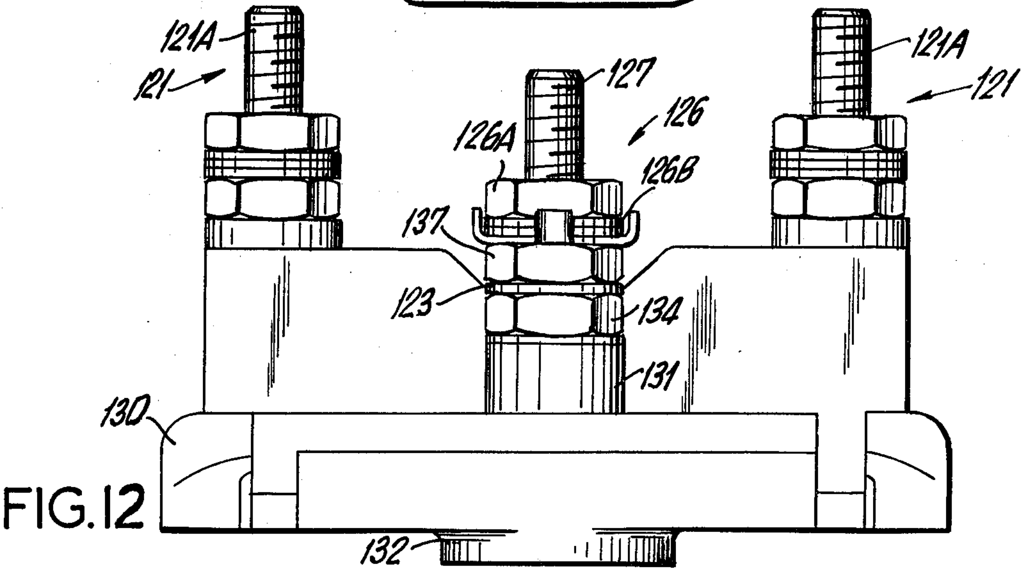
FIG. 12 is an elevation view of the unit of FIG. 11.

An application of the arrester to a station protector configuration is illustrated in FIGS. 10 through 12. Tube 20 per se together with thermal switches 40, 50, 60, 70 have already been described above. However, whereas the embodiment of FIGS. 1 through 4 employed welded flexible circuit coupling leads, the instant embodiment is encapsulated in a modular shell 120 installed in turn in a base assembly 130. Shell 120 also contains fixed line terminals 121 and ground strap 123. Each line electrode end cap 20B is electrically and mechanically connected to a respective line terminal 121 by way of a generally L-shaped connector 122 having one section in engagement with the respective end cap. This section of connector 122 is of generally spade lug configuration with the end cap resiliently engaged by the fingers of the lug.

The opposite end of connector 122 is connected to the ribbed shank portion of threaded stud 121A of terminal 121, the stud being pressed fit into housing 120 as shown particularly in FIG. 10. The threaded shaft portion includes nuts 121B and washers 121C to provide means for connection to the equipment lines.

Connection of center body 20A on tube 20 is provided by way of a generally L-shaped connector 125 having one section of generally spade lug configuration which resiliently engages housing 20A, and another section which is secured to knurled shank 124A of a pin 124 which secures ground strap 123 to center body connector 125.

The distal end of the ground strap 123 is connected to a ground terminal assembly 126 having a threaded stud 127 secured to base 130 by means of nut 134. To facilitate this connection, strap 123 terminates in a lug which fits around shaft 127 and is secured by nut 137. As with the line terminals 121, ground terminal assembly 126 includes nut 126A and associated washers 126B to facilitate connection to the ground line.

The modular unit 120 with its tube and line terminals 121 and ground strap 123 are thus secured in the cavity in base 130 by way of the connection of ground strap 123 to the ground terminal assembly 126. Prior to assembly tube 20 is wrapped and potted in unit 120 as previously described relative to the first described embodiment.

The embodiment of FIGS. 10–12 functions in the manner previously described in connection with the systems of FIGS. 1–9. It furthermore illustrates the facility with which the arrester with its fail-safe features is packaged in various compact configurations.

From the foregoing description, application of the technique to both two-element and multi-element protectors will be apparent.

It should be noted that the fusible member configuration permits improved precision in the establishment of gap spacing in the back up air gap section.

Further, in the embodiment of FIGS. 10–12, it should be noted that the absence of the module 120 from the base assembly prevents the connections of the load circuit to the input lines thereby precluding the making of unprotected connections.

Figure 13:
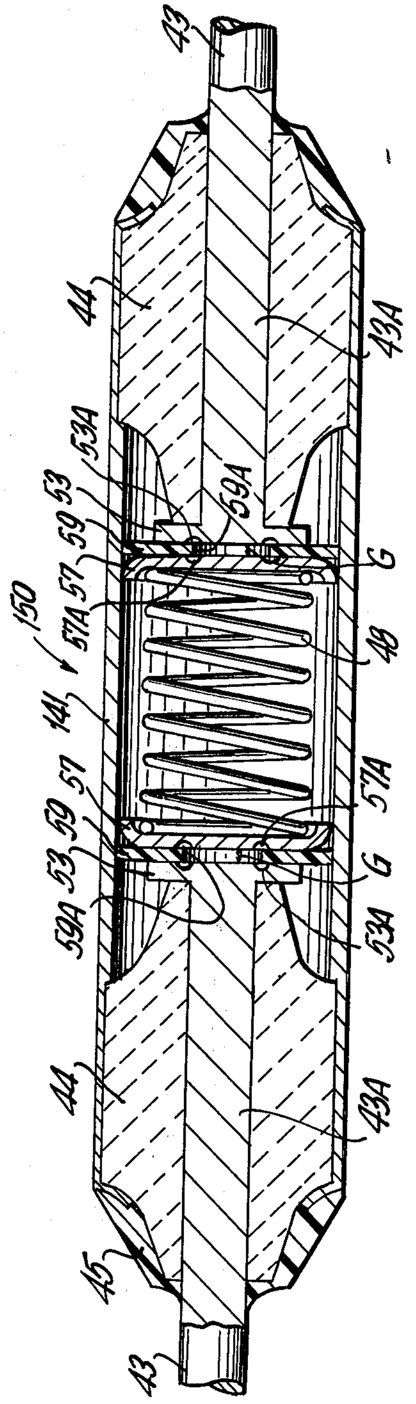
FIG. 13 is a longitudinal, cross-sectional view of a piggy-back thermal switch arrangement having a pair of thermal switches and a pair of air gaps in a single housing.
Figure 14:
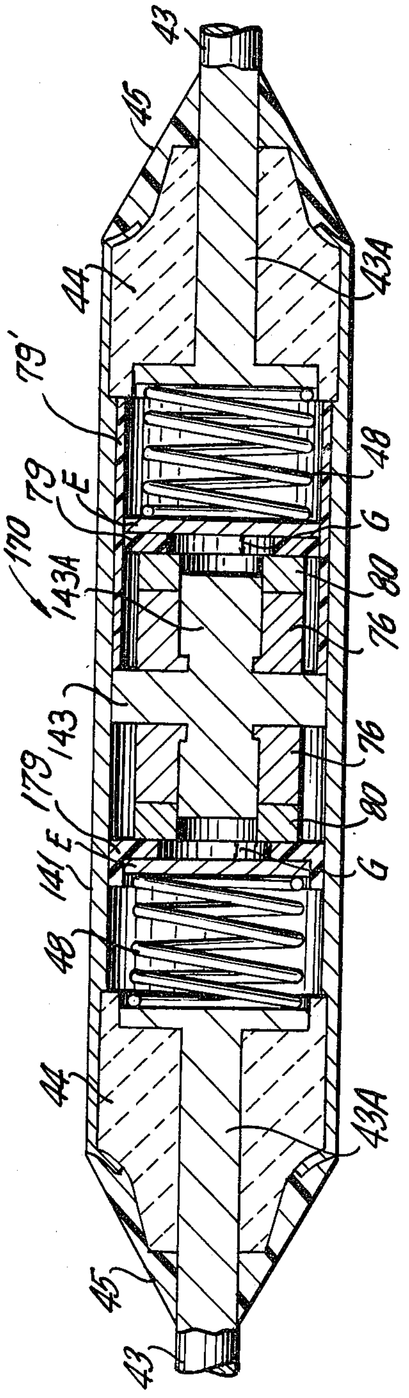
FIG. 14 is a longitudinal cross-sectional view of another piggy-back arrangement.

FIGS. 13 and 14 show yet another variation of the present invention in which a piggy-back switch arrangement is provided so that a pair of thermal switches and air gaps are provided in a single housing.

Switch 150, FIG. 13, is a first type of piggy-back switch. Switch 150 is fabricated from parts common to switch 50, FIG. 6, in major respects so that a detailed description of the common elements need not be repeated. Switch 150 has elongated housing 141 to enclose the common elements for each thermal switch. In general, switch 150 includes two each of the elements described for switch 50. It will be noted that a single compression spring 48 urges the plungers 57 outwardly.

Switch 150 replaces a pair of switches, for example switch 50, so that leads 43 are secured in electrical contact with the end caps 20B of tube 20 and the conductive housing 141 would be electrically coupled to center body 20A so that ground is established between center body 20A and plungers 57 which are in electrical contact with the interior of housing 141.

The piggy-back switch 170 in FIG. 14 is substantially similar to the switch 70 in FIG. 8. The housing 141 is elongated to contain a pair of switches and air gaps. The elements in switch 170 common to switch 70 are designated by corresponding numerical designations.

At the center of switch 170 is a common ground element 143 of generally disc shaped configuration. Element 143 is in electrical contact with housing 141. Extending outwardly from each side of element 143 is an electrode portion whose structure and function is similar to that of portion 43A in switch 70. Both portions 143A carry a fusible member 76 and washer 80. The air gaps G are formed between the end of washer 80 and the surface of plunger E.

Plunger E must, of course, be insulated from housing 141. To this end two different approaches are shown in FIG. 14. The first approach shown on the right hand side (as viewed in FIG. 14) includes the use of an insulating plastic liner 79' positioned around the interior surface of the housing 141 in the vicinity of plunger travel. Additionally, liner 79', as shown, also acts to prevent arcing between the right spring 48 and housing 141. Arcing between spring 48 and housing 141 can be controlled by properly selecting the outer diameter of spring 48 to provide a clearance with housing 141 which is greater than the air gap distance G.

The second approach is shown in the left portion of FIG. 14. This approach involves a modification of insulator 79 to provide a flange portion on the insulator 179. The flange portion is again interposed between the plunger E and the housing 141. Advantageously, the flange should extend beyond the rear edge of the plunger, as illustrated, to militate against possible surface discharge along the edge of the flange.

The application of switch 170 to a gas tube 20 is as previously described. The housing 141 is placed in electrical contact with center body 20A, e.g. by soldering, direct contact or lead lines, and leads 43 are connected to their respective end caps 20B.

It may also be advantageous to coat the electrode surfaces which define the air gaps in each of the embodiments disclosed with copper oxide by known techniques or graphite to tailor the performance of the arcing at the air gap.

These and other modifications may be made by those skilled in the art without departing from the scope and spirit thereof as pointed out in the appended claims.

What is claimed is:

1. A unitary thermal switch comprising electrically conductive means; a pair of conductors, one of said conductors being in electrical contact with said conductive means, the other conductor being spaced from said one conductor and insulated from said conductive means; conductive plunger means in electrical contact with said one conductor and biased toward a contacting position with said other conductor; thermally fusible insulator means interposed between said plunger and other conductor, which fuses to permit said plunger means to contact said other conductor when subjected to heating to short the switch; and means defining an air gap between said conductors to protect the switch in the event of voltage overloads.

2. The switch of claim 1, wherein said air gap means includes a pair of conductive layers, an insulating layer interposed between said conducting layers and defining an aperture therein to form said air gap.

3. The switch of claim 1, wherein said air gap means is internal of said thermal switch.

4. The switch of claim 3, wherein said air gap means is external to said thermal switch.

5. The switch of claim 1, wherein said air gap is between said other conductor and said conductive means.

6. The switch of claim 1, wherein said air gap is between said other conductor and said plunger.

7. The switch of claim 1, wherein said thermally fusible insulator means is a plastic.

8. The switch of claim 1, wherein said thermally fusible insulator means is heat-shrinkable plastic.

9. The switch of claim 1, wherein said thermally fusible insulator means is a fluoropolymer.

10. The switch of claim 1, wherein said integral insulator-fusible means is disc shaped.

11. The switch of claim 10, wherein said air gap is between said other conductor and said conductive means.

12. The switch of claim 1, wherein said other conductor includes a protrusion at its free end, said protrusion abutting said integral insulator-fusible means to pass therethrough when said fusible means yields.

13. The switch of claim 1, wherein said integral insulator-fusible means is ring shaped.

14. The switch of claim 13, wherein said air gap is between said other conductor and said plunger; the thickness of said ring defining air gap distance.

15. The switch of claim 1, wherein said air gap means includes means for controlling the location of arcing therein.

16. The switch of claim 15, wherein said arc control means includes a protrusion extending from at least one of the arcing surfaces in the air gap means.

17. The switch of claim 16, wherein a pair of protrusions are provided.

18. The switch of claim 1, wherein said air gap means includes a pair of surfaces having a layer selected from the group consisting of copper oxide and graphite, said layer being located at least in the area of the arcing surfaces of the air gap.

19. The switch of claim 1, wherein said conductive means is a tubular housing.

20. A surge arrester system comprising:

(i) a gas filled surge arrester having at least two electrodes defining and ionization gap therebetween;

(ii) thermal switch means positioned on said arrester in thermally responsive relationship with said ionization gap and electrically coupled to said electrodes, said thermal switch being thermally responsive to short circuit said electrodes in the event of sustained overload of said arrester, said thermal switch means being a unitary enclosed assembly comprising electrically conductive means; a pair of conductors, one of said conductors being in electrical contact with said conductive means, the other conductor being spaced from said one conductor and insulated from said conductive means; conductive plunger means in electrical contact with said one conductor and biased toward a contacting position with said other conductor; thermally fusible insulator means interposed between said plunger and other conductor, which fuses to permit said plunger to contact said other conductor when subjected to heating to short the switch; and (iii) air gap means electrically connected across said electrodes to provide back-up protection to said surge arrester.

21. A system of claim 1, wherein said air gap means and thermal switch are integral.

22. A system of claim 21, wherein said air gap means is within said thermal switch.

23. A system of claim 21, wherein said air gap means is external to said thermal switch.

24. A system of claim 1, wherein said surge arrester has two line electrodes and a ground electrode, and a thermal switch and air gap means is provided across each line electrode and ground electrode.

25. A system of claim 1, wherein said air gap is about 3 mils.

26. A system of claim 1, wherein said air gap has a strike voltage in the range of 550–850 volts D.C.

27. The system of claim 1, wherein said air gap is between said other conductor and said conductive means.

28. The system of claim 1, wherein said air gap is between said other conductor and said plunger.

29. The system of claim 1, wherein said thermally fusible means is a plastic.

30. The system of claim 1, wherein said fusible means is heat-shrinkable plastic.

31. The system of claim 1, wherein said fusible means is a fluoropolymer.

32. The system of claim 1, wherein said integral insulator-fusible means is disc shaped.

33. The system of claim 32, wherein said air gap is between said other conductor and said conductive means.

34. The system of claim 1, wherein said integral insulator-fusible means is ring shaped.

35. The system of claim 1, wherein said thermal switch means is in direct contact with said surge arrester.

36. The system of claim 1, wherein a pair of air gaps and a pair of thermal switch means are provided, said air gaps and said switch means being contained within a single enclosure.

37. The system of claim 1, wherein said conductive means is a tubular housing.

38. A fail-safe arrester system comprising:

(i) a gas filled surge arrester having at least two electrodes defining an ionization gap therebetween;

(ii) thermal switch means positioned on said arrester in thermally responsive relationship with said ionization gap and electrically coupled to said electrodes, said thermal switch being thermally responsive to short circuit said electrodes in the event of sustained overload of said arrester, said thermal switch means being a unitary assembly comprising electrically conductive means; a pair of conductors, one of said conductors being in electrical contact with said conductive means, the other conductor being spaced from said one conductor and insulated from said conductive means; conductive plunger means in electrical contact with said one conductor and biased toward a contacting position with said other conductor; thermally fusible insulator means interposed between said plunger and other conductor, which fuses to permit said plunger to contact said other conductor when subjected to heating to short the switch; and means defining an air gap between said conductors to protect the switch in the event of voltage overloads; and (iii) module means for retaining said arrester, switch means and air gap means, said module means also including terminal means for connecting said electrodes to the circuit to be protected, said terminal means also being adapted to serve as the junction interconnecting said circuit and the network supplying same, whereby in the absence of said module means said interconnection cannot be made.

39. A surge arrester system comprising:

(i) a gas filled surge arrester having at least two electrodes defining an ionization gap therebetween;

(ii) thermal switch means in thermally responsive relationship with said ionization gap and electrically coupled to said electrodes, said thermal switch being thermally responsive to short circuit said electrodes in the event of sustained overload of said arrester; said thermal switch means comprising electrically conductive means; a pair of conductors, one of said conductors being in electrical contact with said conductive means, the other conductor being spaced from said one conductor and insulated from said conductive means; conductive plunger means in electrical contact with said one conductor and biased toward a contacting position with said other conductor; integral insulator thermally fusible means interposed between said plunger and other conductor and operative to permit said plunger to contact said other conductor when subjected to heating to short the switch, said other conductor including a protrusion at its free end, said protrusion abutting said integral insulator-fusible means to pass therethrough when said fusible means yields, and means defining an air gap between said conductors to protect the switch in the event of voltage overloads.

40. A system of claim 39, wherein said air gap means and thermal switch are integral.

41. A system of claim 40, wherein said air gap means is within said thermal switch.

42. A system of claim 39, wherein said surge arrester has two line electrodes and a ground electrode, and a thermal switch and air gap means is provided across each line electrode and ground electrode.

43. A system of claim 39, wherein said air gap is about 3 mils.

44. A system of claim 39, wherein said air gap has a strike voltage in the range of 550–850 volts D.C.

45. The system of claim 39, wherein said air gap is between said other conductor and said conductive means.

46. The system of claim 39, wherein said integral insulator-fusible means is a plastic.

47. The system of claim 39, wherein said integral insulator-fusible means is heat-shrinkable plastic.

48. The system of claim 39, wherein said integral insulator-fusible means is a fluoropolymer.

49. The system of claim 39, wherein said integral insulator-fusible means is disc shaped.

50. The system of claim 49, wherein said air gap is between said other conductor and said conductive means.

51. The system of claim 39, wherein said thermal switch means is in direct contact with said surge arrester.

52. The system of claim 39, wherein said conductive means is a tubular housing.

53. A unitary thermal switch comprising:

electrically conductive means;

a pair of conductors, one of said conductors being in electrical contact with said conductive means, the other conductor being spaced from said one conductor and insulated from said conductive means;

conductive plunger means in electrical contact with said one conductor and biased toward a contacting position with said other conductor;

integral insulator-fusible means interposed between said plunger and other conductor and operative to permit said plunger means to contact said other conductor when subjected to heating to short the switch;

means defining an air gap between said conductors to protect the switch in the event of voltage overloads; and said other conductor including a protrusion at its free end, said protrusion abutting said integral insulator-fusible means to pass therethrough when said fusible means yields.

54. The switch of claim 53, wherein said air gap means is internal of said thermal switch.

55. The switch of claim 53, wherein said conductive means is a tubular housing.

56. The switch of claim 53, wherein said air gap is between said other conductor and said conductive means.

57. The switch of claim 53, wherein said integral insulator-fusible means is a plastic.

58. The switch of claim 53, wherein said integral insulator-fusible means is heat-shrinkable plastic.

59. The switch of claim 53, wherein said integral insulator-fusible means is a fluoropolymer.

60. The switch of claim 53, wherein said integral insulator-fusible means is disc shaped.

61. The switch of claim 53, wherein said air gap is between said other conductor and said conductive means.

62. The switch of claim 53, wherein said air gap means includes a pair of surfaces having a layer selected from the group consisting of copper oxide and graphite, said layer being located at least in the area of the arcing surfaces of the air gap.

63. A switch of claim 53, wherein said conductive plunger means is a compression spring.

* * * * *